United States Patent
Hikima et al.

(10) Patent No.: US 11,107,489 B2
(45) Date of Patent: Aug. 31, 2021

(54) SIGNAL PROCESSING APPARATUS

(71) Applicant: DENSO TEN Limited, Kobe (JP)

(72) Inventors: Katsuaki Hikima, Kobe (JP); Atsushi Nakagawa, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 16/776,629

(22) Filed: Jan. 30, 2020

(65) Prior Publication Data

US 2020/0411028 A1 Dec. 31, 2020

(30) Foreign Application Priority Data

Jun. 26, 2019 (JP) .............................. JP2019-118945

(51) Int. Cl.
| | |
|---|---|
| *G10L 21/0232* | (2013.01) |
| *H04M 1/60* | (2006.01) |
| *G10L 25/51* | (2013.01) |
| *G10L 21/0208* | (2013.01) |
| *H04M 9/08* | (2006.01) |

(52) U.S. Cl.
CPC .......... *G10L 21/0232* (2013.01); *G10L 25/51* (2013.01); *H04M 1/6033* (2013.01); *G10L 2021/02082* (2013.01)

(58) Field of Classification Search
None
See application file for complete search history.

(56) References Cited

U.S. PATENT DOCUMENTS

| | | | | |
|---|---|---|---|---|
| 6,990,194 B2* | 1/2006 | Mikesell | ............... | H04M 9/082 |
| | | | | 379/406.04 |
| 10,629,220 B1* | 4/2020 | Nicholson | ............... | H04R 3/04 |
| 2009/0257579 A1* | 10/2009 | Takada | ..................... | H04B 3/23 |
| | | | | 379/406.08 |
| 2010/0227643 A1* | 9/2010 | Yew | ......................... | H04W 4/12 |
| | | | | 455/557 |
| 2013/0156209 A1* | 6/2013 | Visser | ...................... | H04M 1/20 |
| | | | | 381/66 |
| 2013/0170668 A1* | 7/2013 | Hess | ......................... | H04S 7/30 |
| | | | | 381/107 |
| 2015/0016633 A1* | 1/2015 | Gao | ......................... | H03G 3/32 |
| | | | | 381/107 |
| 2018/0035223 A1* | 2/2018 | Vicinus | .................... | H04R 3/02 |
| 2019/0096398 A1* | 3/2019 | Sereshki | ................ | G10L 15/22 |
| 2019/0251960 A1* | 8/2019 | Maker | .................... | G10L 15/08 |
| 2020/0098346 A1* | 3/2020 | Kemmerer | ............. | G10K 11/16 |

FOREIGN PATENT DOCUMENTS

JP 2005-217547 A 8/2005

\* cited by examiner

*Primary Examiner* — Qin Zhu
(74) *Attorney, Agent, or Firm* — Oliff PLC

(57) ABSTRACT

A signal processing apparatus includes a generator, an output controller, and an echo canceller. The generator generates an output sound signal by combining an over-the-phone sound signal with a system sound signal different from the over-the-phone sound signal. The output controller outputs, to a loudspeaker, the output sound signal generated by the generator. The echo canceller cancels the output sound signal from an input sound signal input via a microphone located in a vicinity of the loudspeaker. The output controller suppresses a level of the system sound signal to be output from the loudspeaker so as not to be greater than a predetermined value within a range in which a volume value for the over-the-phone sound signal is settable.

4 Claims, 8 Drawing Sheets

SIGNAL PROCESSING APPARATUS

BACKGROUND OF THE INVENTION

Field of the Invention

The invention relates to a signal processing apparatus and a signal processing method.

Description of the Background Art

Conventionally, there has been an echo cancellation control apparatus that controls sound, so-called echo, that is output from a loudspeaker as sound at a far end of a telephone and is routed back to the far end after being input via a microphone at a near end. Such an apparatus adjusts, based on, for example, a filter coefficient obtained beforehand through learning, a cancellation signal to be input to an echo cancellation circuit.

However, there has been a possibility that the conventional technology cannot fully cancel a system sound, such as a ring back tone output from the loudspeaker, for example, when a volume of the sound is high.

SUMMARY OF THE INVENTION

According to one aspect of the invention, a signal processing apparatus includes a generator, an output controller, and an echo canceller. The generator generates an output sound signal by combining an over-the-phone sound signal with a system sound signal different from the over-the-phone sound signal. The output controller outputs, to a loudspeaker, the output sound signal generated by the generator. The echo canceller cancels the output sound signal from an input sound signal input via a microphone located in a vicinity of the loudspeaker. The output controller suppresses a level of the system sound signal to be output from the loudspeaker so as not to be greater than a predetermined value within a range in which a volume value for the over-the-phone sound signal is settable.

Therefore, an object of the invention is to provide a signal processing apparatus and a signal processing method that easily cancel a system sound by echo cancelling.

These and other objects, features, aspects and advantages of the invention will become more apparent from the following detailed description of the invention when taken in conjunction with the accompanying drawings.

DESCRIPTION OF THE EMBODIMENTS

With reference to the drawings, a signal processing apparatus and a signal processing method of an embodiment will be described below. The invention is not limited by the embodiment described below.

Figure 1A:
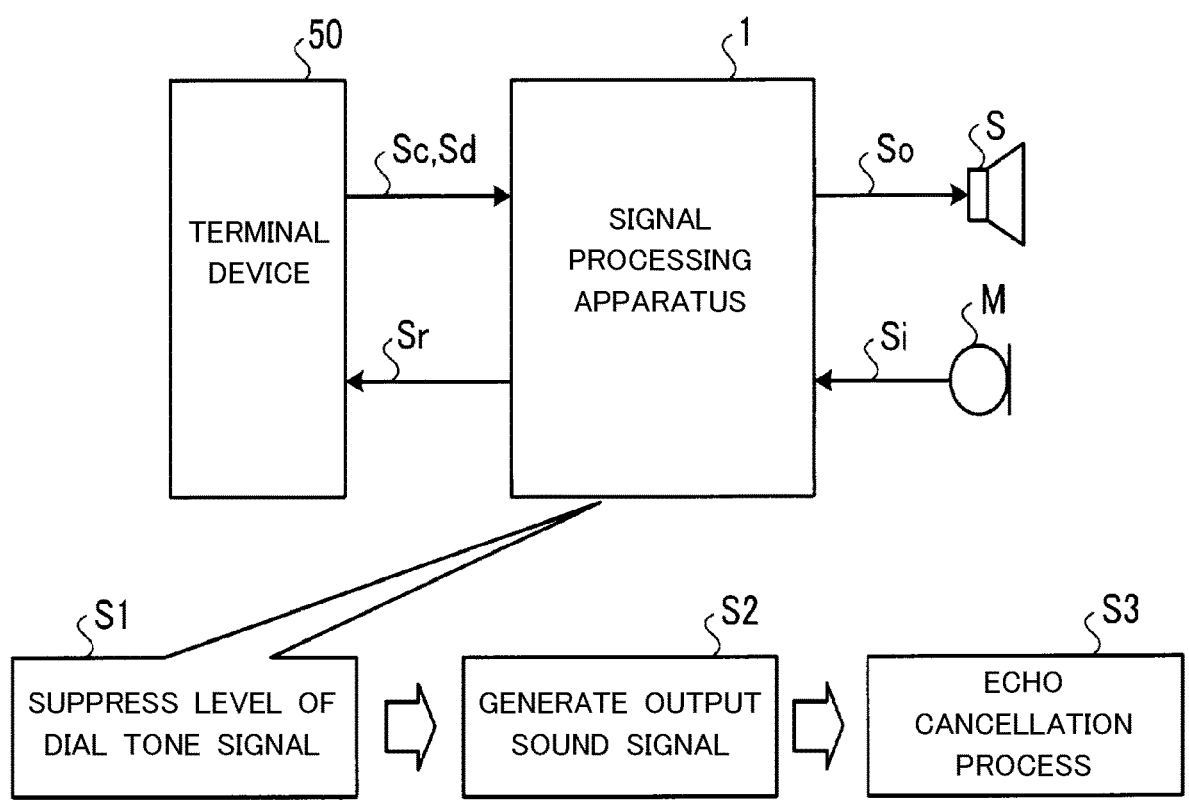
FIG. 1A illustrates an outline of a signal processing method of an embodiment.
Figure 1B:
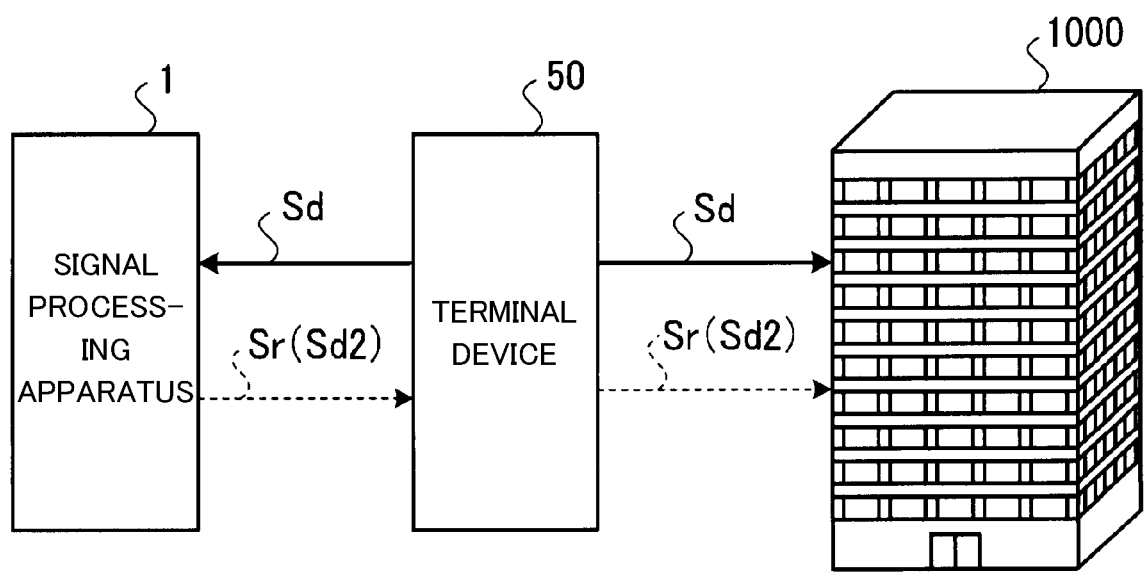
FIG. 1B illustrates an outline of the signal processing method of the embodiment.

With reference to FIG. 1A, first, an outline of the signal processing apparatus and the signal processing method of the embodiment will be described. FIGS. 1A and 1B illustrate the outline of the signal processing method of the embodiment. The signal processing method is performed by a signal processing apparatus 1 shown in FIG. 1A. With reference to FIGS. 1A and 1B, a case in which a system sound signal is a dial tone signal Sd will be described as an example.

The signal processing apparatus 1 shown in FIG. 1A is mounted, for example, in a vehicle, not illustrated, and is connected to a terminal device 50, such as a smartphone of a user, by wire or wirelessly. In collaboration with the terminal device 50, the signal processing apparatus 1 executes applications such as a handsfree communication function and an audio playback function that outputs music played back by the terminal device 50 from a loudspeaker S.

Moreover, the signal processing apparatus 1 includes an echo cancellation function that cancels a sound output from the loudspeaker S during handsfree communication from a sound input via a microphone M located in a vicinity of the loudspeaker. More specifically, the signal processing apparatus 1 generates an output sound signal So based on an over-the-phone sound signal Sc, and outputs the output sound signal So from the loudspeaker S. Then, the signal processing apparatus 1 inputs the output sound signal So, as a cancellation signal, to an echo cancellation circuit so as to cancel the output sound signal So from an input sound signal Si input from the microphone M.

Thus, the signal processing apparatus 1 obtains a conversation sound of the user in the vehicle, as an acoustic sound signal Sr, from the input sound signal Si, and outputs the acoustic sound signal Sr to the terminal device 50.

For example, there is a case in which the system sound signal is input to the signal processing apparatus 1 along with the over-the-phone sound signal Sc of a handsfree telephone conversation during the handsfree communication. One example of the system sound signal is the dial tone signal (dual tone multi-frequency (DTMF) signal) Sd that is generated when a number on a dial is input.

Here, FIG. 1B illustrates an example in which the user makes a handsfree telephone call to a call center 1000. In this case, when the user inputs a number on a dial in accordance with an audio guidance from the call center 1000, the dial tone signal Sd generated from the input of the dial number is sent to the call center 1000 and is output to the signal processing apparatus 1 from the terminal device 50.

The signal processing apparatus 1 outputs the dial tone signal Sd from the loudspeaker S to inform the user of receipt of the input of the dial number. Moreover, the signal processing apparatus 1 generates the acoustic sound signal Sr that does not include the sound signal of a dialing sound input from the microphone M by cancelling the sound signal by use of the echo cancellation function. Then, the signal processing apparatus 1 informs the terminal device 50 of the generated acoustic sound signal Sr.

When a sound from a far end of the telephone (in this example, a sound of the guidance from the call center 1000) is too small to hear, the user may increase a set volume value for the over-the-phone sound signal Sc for a greater volume of the over-the-phone sound signal Sc output from the loudspeaker.

If the set volume value is increased, a volume of the dial tone signal Sd output from the loudspeaker also increases.

However, since the dial tone signal Sd is originated from the terminal device 50 that is located in a near-end of a circuit, the volume of the dial tone signal Sd is high even before increasing a volume of the over-the-phone sound signal Sc. Thus, if the user increases the volume of the over-the-phone sound signal Sc to fully hear the sound from the far end, the volume of the dial tone signal Sd may be increased more than necessary.

When the volume of the dial tone signal Sd output from the loudspeaker is increased, there is a case in which the dial tone signal Sd cannot be fully cancelled from the sound signal input via the microphone M by the echo cancellation function.

For example, as shown in FIG. 1B, in a case where the echo cancellation is not enough, there is a case in which a portion of a dial tone signal Sd2 that has not been cancelled may be input again to the terminal device 50 as the acoustic sound signal Sr. In this case, the dial tone signal Sd2 is output to the call center 1000 from the terminal device 50.

In other words, in a case where the echo cancellation of the dial tone signal Sd is not enough, the call center 1000 is informed of a same dial tone signal Sd twice so that incorrect detection of the input of the dial number occurs at the call center 1000.

Therefore, the signal processing apparatus 1 of this embodiment controls a level of the dial tone signal Sd included in the output sound signal So to suppress the level of the dial tone signal Sd included in the input sound signal Si.

In other words, the signal processing apparatus 1 of this embodiment suppresses the level of the dial tone signal Sd to be output from the loudspeaker S so that the dial tone signal Sd included in the input sound signal Si is in a level or smaller in which the dial tone signal Sd can be fully cancelled by the echo cancellation circuit.

More specifically, as shown in FIG. 1A, the signal processing apparatus 1 of this embodiment suppresses the level of the dial tone signal Sd when receiving the dial tone signal Sd, for example, during the handsfree communication (a step S1).

Next, the signal processing apparatus 1 generates the output sound signal So by combining the dial tone signal Sd with the over-the-phone sound signal Sc (a step S2). The output sound signal So is amplified based on the set volume value for the over-the-phone sound signal Sc, and then is output to the loudspeaker S. Therefore, as the set volume value is greater, the dial tone signal Sd included in the output sound signal So is amplified greater.

Here, the term "controlling the level of the dial tone signal Sd" in the step S1 means that in a case where the level (gain) of the dial tone signal Sd included in the output sound signal So is greater than a predetermined value, the level of the dial tone signal Sd is attenuated to be no greater than the predetermined value.

Moreover, the predetermined value here means an upper limit value of the dial tone signal Sd included in the input sound signal Si that can be fully cancelled by the echo cancellation circuit in a range of settable volume values for the over-the-phone sound signal Sc.

In other words, the dial tone signal Sd included in the input sound signal Si can be fully cancelled by the echo cancellation circuit by controlling (suppressing) the level of the dial tone signal Sd to be the predetermined value or smaller.

Then, the signal processing apparatus 1 inputs the output sound signal So as the cancellation signal to the echo cancellation circuit to perform an echo cancellation process that cancels the output sound signal So from the input sound signal Si input from the microphone M (a step S3).

Thus, since the level of the dial tone signal Sd included in the input sound signal Si can be suppressed to the level in which an echo can be cancelled by the echo cancellation circuit, the dial tone signal Sd can be fully cancelled from the input sound signal Si.

Therefore, the signal processing apparatus 1 generates the acoustic sound signal Sr that does not include the dial tone signal Sd by fully cancelling the dial tone signal Sd. Thus, the acoustic sound signal Sr is output to the terminal device 50 so that the dial tone signal Sd2, shown in FIG. 1B, can be prevented from being output to the call center 1000.

As described above, the signal processing apparatus 1 suppresses the level of the system sound signal beforehand so that the system sound signal can be easily cancelled by the echo cancellation.

Moreover, the signal processing apparatus 1 of this embodiment suppresses the level of the dial tone signal Sd so that when the set volume value for the over-the-phone sound signal Sc is relatively high, the volume of the dial tone signal Sd can be adjusted to be in a proper range. In other words, the dial tone signal Sd can be prevented from being output from the loudspeaker S at a high volume.

Figure 2:
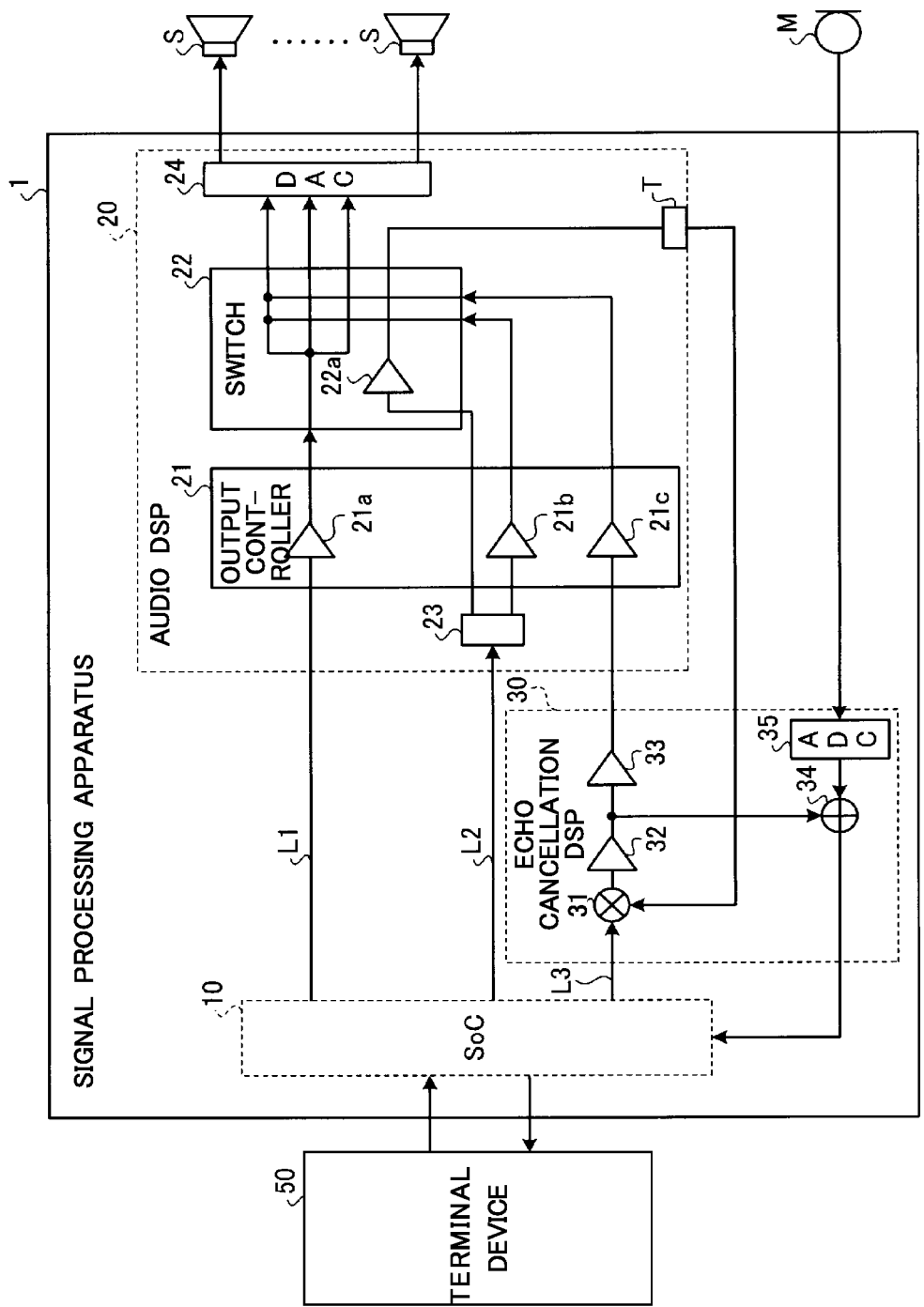
FIG. 2 is a block diagram of a signal processing apparatus.

Next, with reference to FIG. 2, a configuration of the signal processing apparatus 1 of this embodiment will be described. FIG. 2 is a block diagram of the signal processing apparatus 1. As shown in FIG. 2, the signal processing apparatus 1 of this embodiment is a microprocessor including a central processing unit (CPU), a memory, not illustrated, etc. The signal processing apparatus 1 includes a system on chip (Soc) 10 and an audio digital signal processor (DSP) 20, and an echo cancellation DSP 30.

The SoC 10 is an IC including a series of functions of obtaining an audio signal from the terminal device 50, outputting the acoustic sound signal Sr, described above, to the terminal device 50, etc. In an example shown in FIG. 2, the SoC 10 is connected to the audio DSP 20 via a first signal line L1 and a second signal line L2, and is connected to the echo cancellation DSP 30 via a third signal line L3.

In the example shown in FIG. 2, the first signal line L1 is for inputting a signal of basic sound, such as music, to the audio DSP 20, and the second signal line L2 is for inputting the system sound signal, such as a dial tone signal and an interrupt sound, to the audio DSP 20, and the third signal line L3 is for inputting the over-the-phone sound signal Sc to the echo cancellation DSP 30.

The SoC 10 directs each sound signal to one of the output signal lines, depending on a type of the sound signal input from the terminal device 50. Moreover, the SoC 10 includes a function of informing the terminal device 50 of the acoustic sound signal Sr input from the echo cancellation DSP 30 during the handsfree communication.

The audio DSP 20 includes an output controller 21, a switch 22, a switching element 23, and a digital analog converter (DAC) 24. The output controller 21 is a CPU that entirely controls the audio DSP 20.

The output controller 21 performs, for example, a process that sets the volume of the sound signal input from the SoC 10 or the echo cancellation DSP 30, and a process that determines the loudspeaker S to which the sound signal is output. For example, the output controller 21 discriminates the type of the sound signal based on a command included in each sound signal and determines, based on the type of the sound signal, the loudspeaker S to which the sound signal is output.

Moreover, FIG. 2 illustrates an example in which the output controller 21 includes amplifiers 21a to 21c, and functions as an amplifier apparatus that amplifies the sound signals.

Moreover, as shown in FIG. 2, the second signal line L2 branches into two signal routes at the switching element 23. In other words, the system sound signal input from the SoC 10 is input to the switch 22 via one of the two routes into which the second signal line L2 branches at the switching element 23.

Figure 3A:
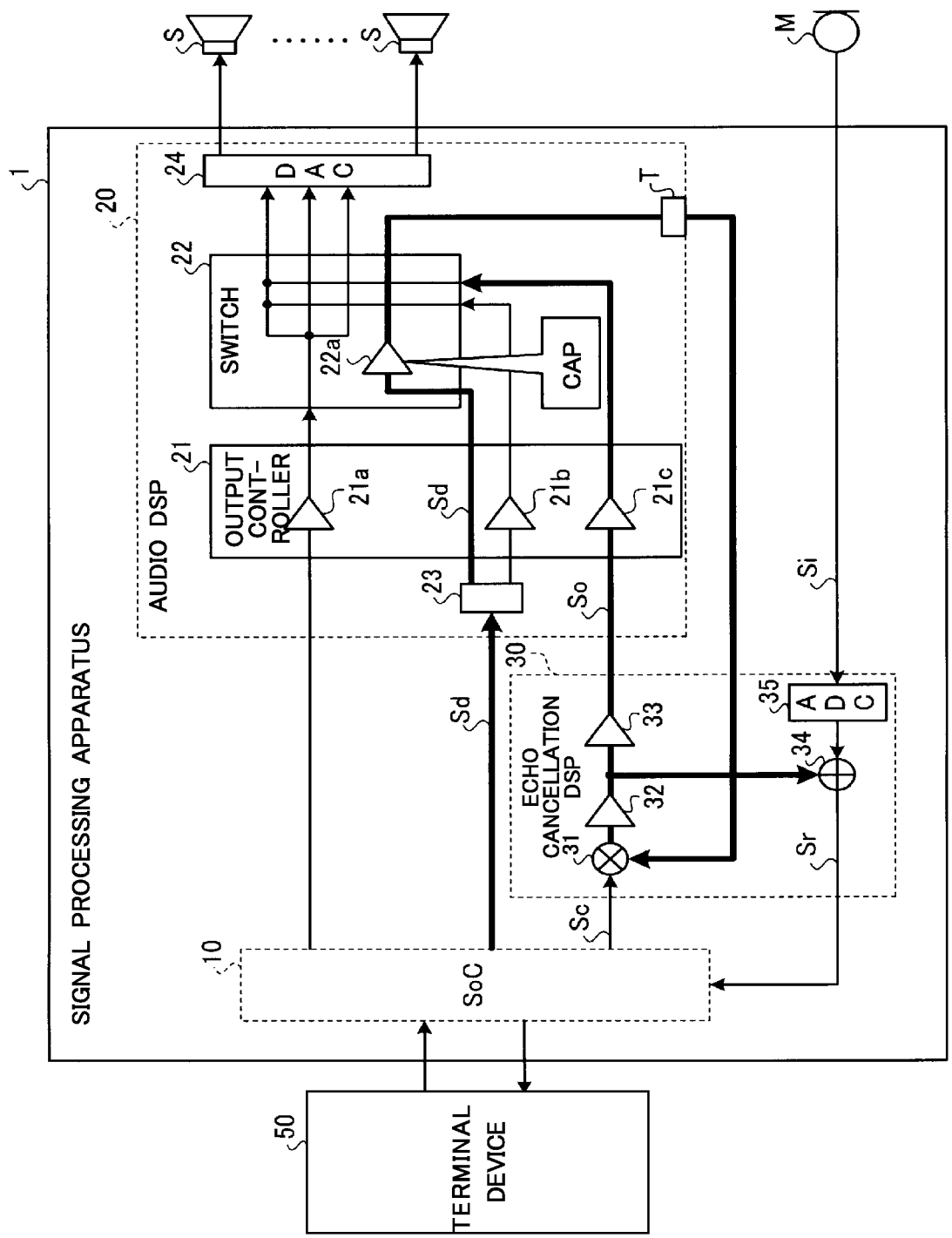
FIG. 3A illustrates a signal route of a system sound signal.
Figure 3B:
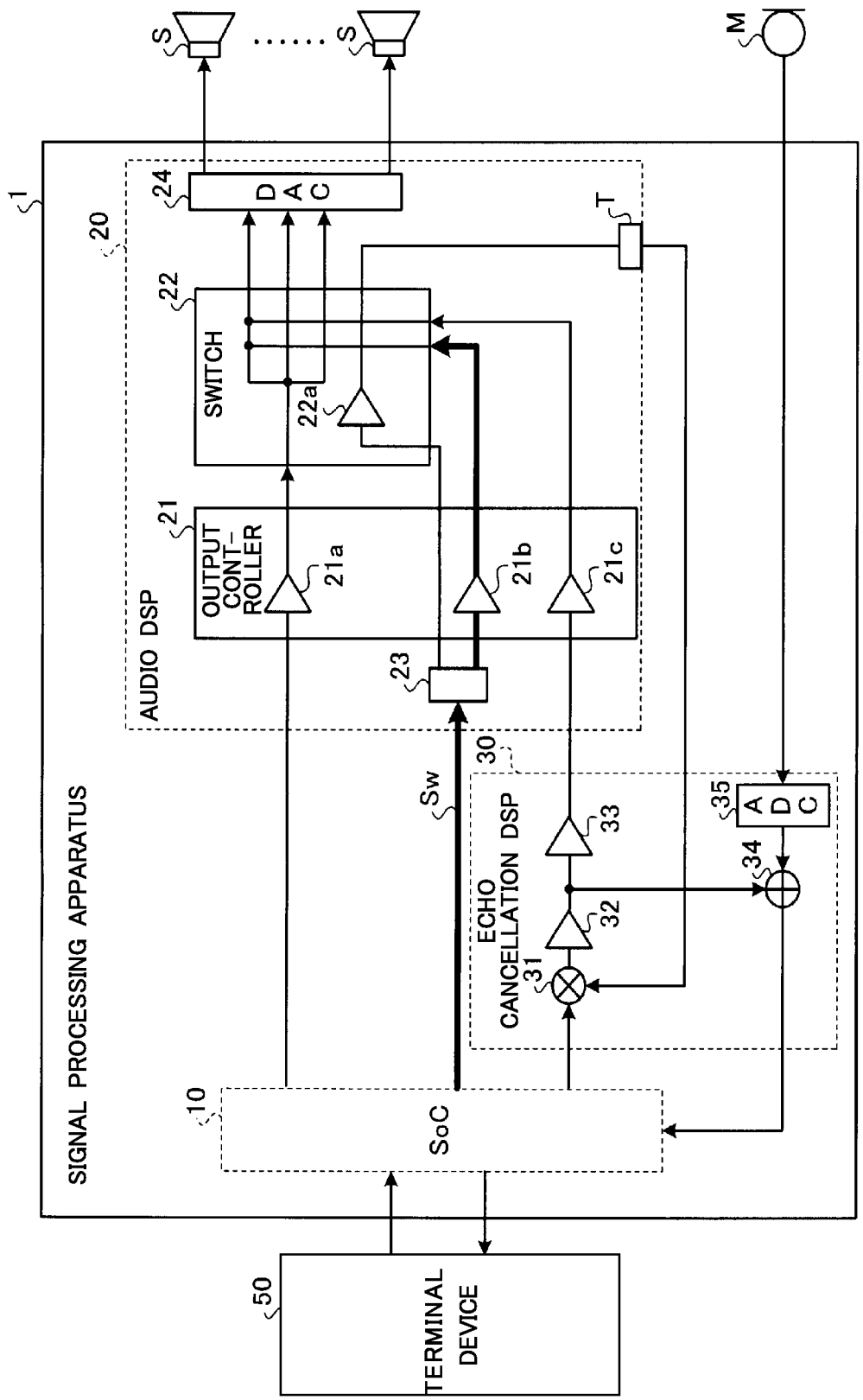
FIG. 3B illustrates a signal route of a system sound signal.

FIGS. 3A and 3B are schematic diagrams illustrating signal routes of the system sound signal. First, with reference to FIG. 3A, a signal route of the dial tone signal Sd of the system sound signals will be described. As shown in FIG. 3A, the dial tone signal Sd input into the audio DSP 20 is input to the switch 22. Next, the dial tone signal Sd is input into the echo cancellation DSP 30 via an amplifier 22a provided in the switch 22 and then via an output terminal T.

Here, the amplifier 22a is a circuit to suppress the level of the dial tone signal Sd. The output controller 21 determines, based on a current set volume value set for the over-the-phone sound signal Sc, an amplification factor that is used by the amplifier 22a. More specifically, the output controller 21 first compares the current set volume value to a sound volume threshold.

Here, the sound volume threshold is set as a benchmark for a set volume value for the output sound signal So to suppress the dial tone signal Sd included in the input sound signal Si to the level in which the dial tone signal Sd is fully cancelled (controlled) by an echo cancellation circuit 34.

In other words, before combining the dial tone signal Sd with the over-the-phone sound signal Sc, the output controller 21 determines whether or not to suppress the dial tone signal Sd, based on the set volume value for the over-the-phone sound signal Sc. The set volume value is, for example, determined based on a user operation made with an operation unit (e.g., a dial), not illustrated.

When the current set volume value is equal to or smaller than the sound volume threshold, the output controller 21 determines the amplification factor for the amplifier 22a in accordance with the set volume value. On the other hand, when the current set volume value is greater than the sound volume threshold, the output controller 21 suppresses the amplification factor for the amplifier 22a to cap the amplification factor at the upper limit value. Thus, the level of the dial tone signal Sd included in the output sound signal So is suppressed.

As described above, when the set volume value for the output sound signal So is great enough, the output controller 21 caps the level of the dial tone signal Sd so as to control the dial tone signal Sd included in the input sound signal Si to be in the level in which the dial tone signal Sd can be fully cancelled by the echo cancellation circuit 34.

Moreover, when the current set volume value is equal to or smaller than the sound volume threshold, the output controller 21 sets the amplification factor for the amplifier 22a to a value in accordance with the current set volume value. In this case, the output controller 21 sets the amplification factor for the amplifier 22a to a value, for example, proportional to the set volume value. In other words, in this case, the dial tone signal Sd is amplified by the amplifier 22a in accordance with the volume of the over-the-phone sound signal Sc. Thus, it is possible to properly inform the user of the dial tone signal Sd.

Further, as shown in FIG. 3A, the dial tone signal Sd goes through the audio DSP 20 twice. In other words, the audio DSP 20 performs the process that suppresses the level of the dial tone signal Sd and the process that sets the volume of the output sound signal So including the dial tone signal Sd.

If the audio DSP 20 only performs the latter, another DSP is required to perform the process that suppresses the level of the dial tone signal Sd. Since the audio DSP 20 of the signal processing apparatus 1 performs both the processes, the signal processing apparatus 1 does not need another DSP. Thus, with this configuration, it is possible to cancel the dial tone signal Sd without cost of the another DSP.

Next, with reference to FIG. 3B, a signal route of the system sound signal other than the dial tone signal Sd will be described below. An interrupt sound signal Sw will be described below as an example of the system sound signal other than the dial tone signal Sd. One among the interrupt sound signals Sw is a sound signal of route guidance output from a navigation system.

As shown in FIG. 3B, the interrupt sound signal Sw input into the audio DSP 20 travels along the signal route different from the signal route of the dial tone signal Sd after the switching element 23. More specifically, as shown in FIG. 3B, the interrupt sound signal Sw is amplified to a predetermined level by the amplifier 21b provided to the output controller 21, and then is input into the switch 22. After that, the interrupt sound signal Sw is output to the loudspeaker S via the switch 22.

As described above, as shown in FIG. 3B, the interrupt sound signal Sw travels along the same signal route as the dial tone signal Sd does until the switching element 23. After the switching element 23, the interrupt sound signal Sw travels along a signal route that bypasses the echo canceller so as not go through the echo cancellation DSP 30.

Moreover, the amplification factor for the amplifier 21c is a value set by the user operation for the interrupt sound signal Sw. For example, the user can select a set volume value for the interrupt sound signal Sw from amongst seven values. The output controller 21 sets the amplification factor for the amplifier 21c, based on the set volume value selected by the user.

As described above, the interrupt sound signal Sw travels along the signal route that does not go through the echo cancellation DSP 30. Thus, the set volume value for the interrupt sound signal Sw can be a constant value, regardless of the set volume value for the over-the-phone sound signal Sc.

In other words, the output controller 21 switches the signal route of the system sound signal input from the second signal line L2 based on the type of the system sound signal. Each system sound signal can be properly processed.

With reference back to FIG. 2, the switch 22 will be described. The switch 22 includes a plurality of switching circuits, not illustrated, in addition to the amplifier 22a. The switch 22 switches the switching circuits based on an instruction of the output controller 21 so as to combine the sound signals or redirect an output route leading to the DAC 24. Then, after the sound signal output to the DAC 24 from the switch 22 is converted into an analogue sound signal from a digital sound signal at the DAC 24. Then, the converted sound signal is output to the loudspeaker S.

Next, the echo cancellation DSP 30 will be described. The echo cancellation DSP 30 executes the echo cancellation function. As shown in FIG. 2, the echo cancellation DSP 30 includes a mixer 31, amplifiers 32 and 33, the echo cancellation circuit 34, and an ADC 35.

The mixer 31 functions as a generator that generates the output sound signal So by combining the over-the-phone sound signal Sc input from the SoC 10 with the dial tone signal Sd input from the audio DSP 20.

The output sound signal So generated by the mixer 31 is amplified by the amplifier 32. Then, the output sound signal So is input to the output controller 21 via the amplifier 33. Moreover, the output sound signal So is input, as the cancellation signal, into the echo cancellation circuit 34 via a delay circuit, an inverting circuit, etc. not illustrated.

As shown in FIG. 2, the echo cancellation circuit 34 is an adder, an example of an echo cancellation portion. The echo cancellation circuit 34 adds the input sound signal Si input via the ADC 35 from the microphone M with the cancellation signal based on the output sound signal So so as to generate the acoustic sound signal Sr without the output sound signal So from the input sound signal Si.

Here, the level of the dial tone signal Sd output from the loudspeaker S is suppressed to the level such that the dial tone signal Sd included in the input sound signal Si can be cancelled by the echo cancellation circuit 34.

Therefore, the echo cancellation circuit 34 generates the acoustic sound signal Sr that is the input sound signal Si from which the dial tone signal Sd has been fully cancelled. Then, the acoustic sound signal Sr is output to the terminal device 50 via the SoC 10.

Figure 4:
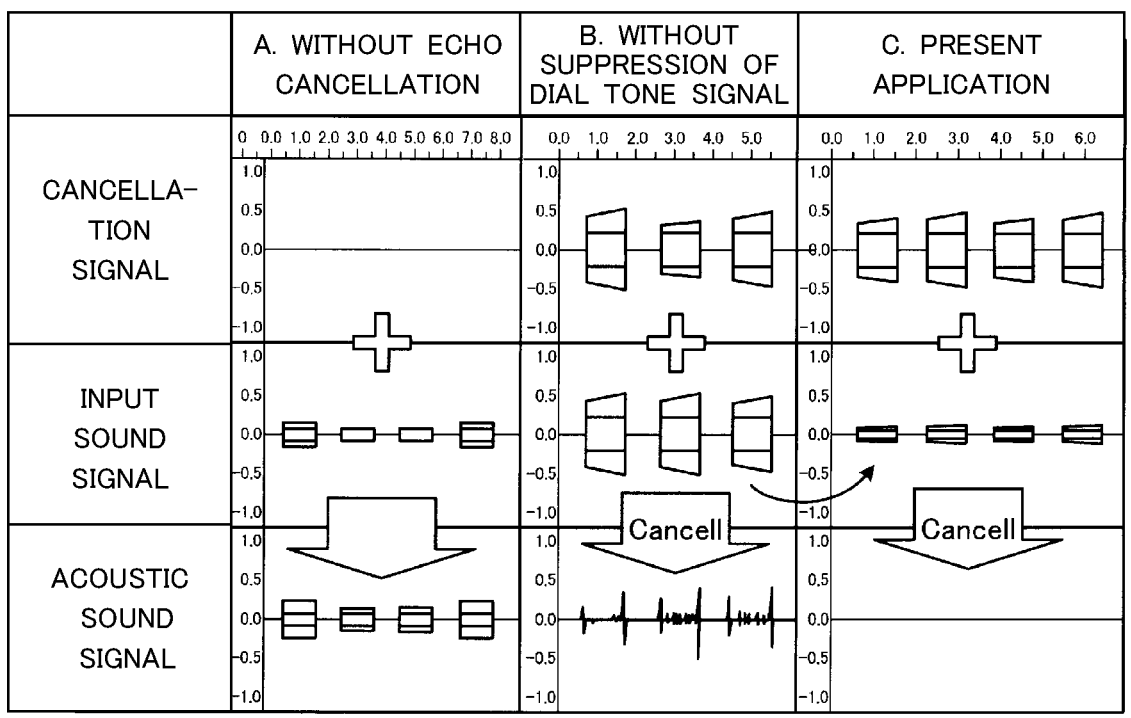
FIG. 4 illustrates a comparison result of acoustic sound signals.

Next, with reference to FIG. 4, a comparison result of the acoustic sound signal Sr will be described. FIG. 4 illustrates the comparison result of the acoustic sound signal Sr. A and B shown in FIG. 4 are comparison results. A column A in FIG. 4 shows a case in which the echo cancellation is not performed, and a column B in FIG. 4 shows a case in which the echo cancellation is performed without suppressing the level of the dial tone signal Sd.

As shown in the column A in FIG. 4, in the case where the echo cancellation is not performed, the input sound signal Si is nearly equal to the acoustic sound signal Sr. Thus, the dial tone signal Sd included in the input sound signal Si is output to the terminal device 50.

As shown in the column B in FIG. 4, in the case where the level of the dial tone signal Sd is not suppressed, the dial tone signal Sd included in the input sound signal Si is not fully cancelled. Then, the dial tone signal Sd is output to the terminal device 50.

Meanwhile, as shown in a column C in FIG. 4, in the case where the level of the dial tone signal Sd is suppressed, the level of the dial tone signal Sd included in the input sound signal Si becomes small. Thus, the dial tone signal Sd can be fully cancelled from the input sound signal Si.

As described above, in this embodiment, the dial tone signal Sd can be fully cancelled from the input sound signal Si by suppressing the level of the dial tone signal Sd.

Figure 5:
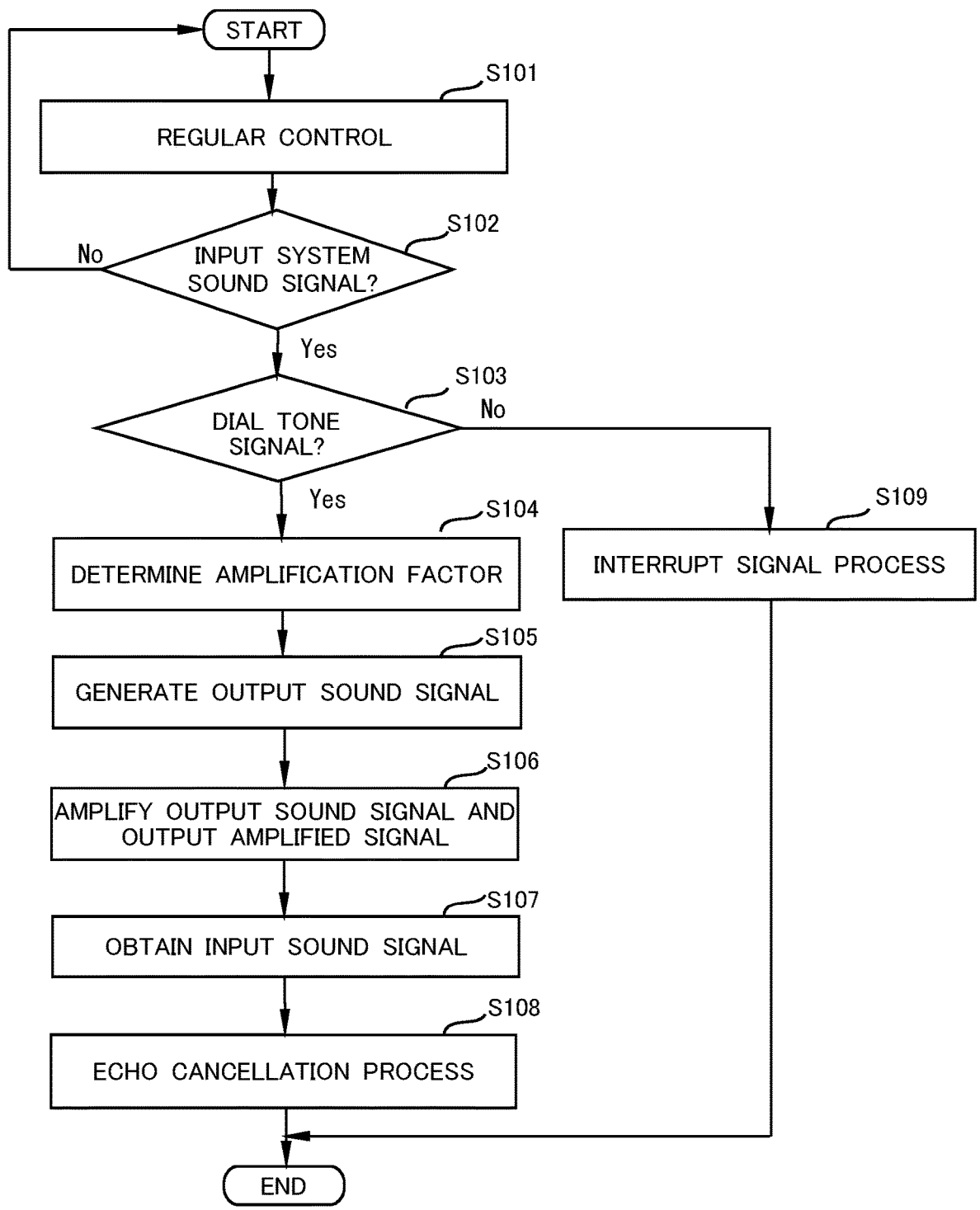
FIG. 5 is a flowchart of a process procedure that is performed by the signal processing apparatus.

Next, with reference to FIG. 5, a process procedure that is performed by the signal processing apparatus 1 of this embodiment will be described. FIG. 5 is a flowchart of the process procedure that is performed by the signal processing apparatus 1. The procedure below is repeatedly performed by the signal processing apparatus 1.

As shown in FIG. 5, the signal processing apparatus 1 executes a regular control (a step S101). The regular control means a sound signal process that is performed for the sound signal (an audio sound signal and/or the over-the-phone sound signal Sc) other than the system sound signal.

Next, the signal processing apparatus 1 determines whether or not the system sound signal has been input (a step S102). When the system sound signal has not been input (No in the step S102), the procedure moves to the step S101.

When the system sound signal has been input (Yes in the step S102), the signal processing apparatus 1 determines whether or not the system sound signal is the dial tone signal Sd (a step S103).

When the system sound signal is the dial tone signal Sd (Yes in the step S103), the signal processing apparatus 1 determines, based on the set volume value set for the over-the-phone sound signal Sc, the amplification factor that is used by the amplifier 22a (a step S104).

When the set volume value is greater than the sound volume threshold in the step S104, the signal processing apparatus 1 caps the amplification factor at the upper limit value or smaller. Then, the signal processing apparatus 1 generates the output sound signal So by combining the dial tone signal Sd amplified by the amplifier 22a with the over-the-phone sound signal Sc (a step S105).

Next, the signal processing apparatus 1 amplifies the output sound signal So based on the set volume value that is set for the over-the-phone sound signal Sc, and outputs the amplified output sound signal So (a step S106). Then, the signal processing apparatus 1 obtains the input sound signal Si based on the output sound signal So output in the step S106 (a step S107).

Next, the signal processing apparatus 1 performs the echo cancellation process based on the input sound signal Si and the cancellation signal based on the output sound signal So (a step S108), and then ends the procedure.

Further, when the system sound signal is not the dial tone signal Sd (No in the step S103) in the step S103, the system sound signal is the interrupt sound signal Sw. Thus, the signal processing apparatus 1 performs an interrupt sound procedure for the interrupt sound signal Sw (a step S109), and then ends the procedure.

As described above, the signal processing apparatus 1 of the embodiment includes the mixer 31 (the example of a generator), the output controller 21, and the echo cancellation circuit 34 (the example of the echo cancellation portion). The generator generates the output sound signal So by combining the over-the-phone sound signal Sc with the system sound signal different from the over-the-phone sound signal Sc. The output controller 21 outputs to the loudspeaker S the output sound signal So generated by the generator. The echo cancellation portion cancels the output sound signal So from the input sound signal Si input via the microphone M (an example of a microphone).

Further, the output controller 21 suppresses the level of the system sound signal to be output from the loudspeaker so as not to be greater than the predetermined value within the range in which the volume value for the over-the-phone sound signal Sc is settable. Therefore, the signal processing apparatus 1 of the embodiment easily cancels the system sound by the echo cancellation.

The embodiment described above explained the case of the amplifier built-in signal processing apparatus 1 that includes the amplifier apparatus in the audio DSP 20. However, the amplifier apparatus may be provided outside the signal processing apparatus 1.

Figure 6:
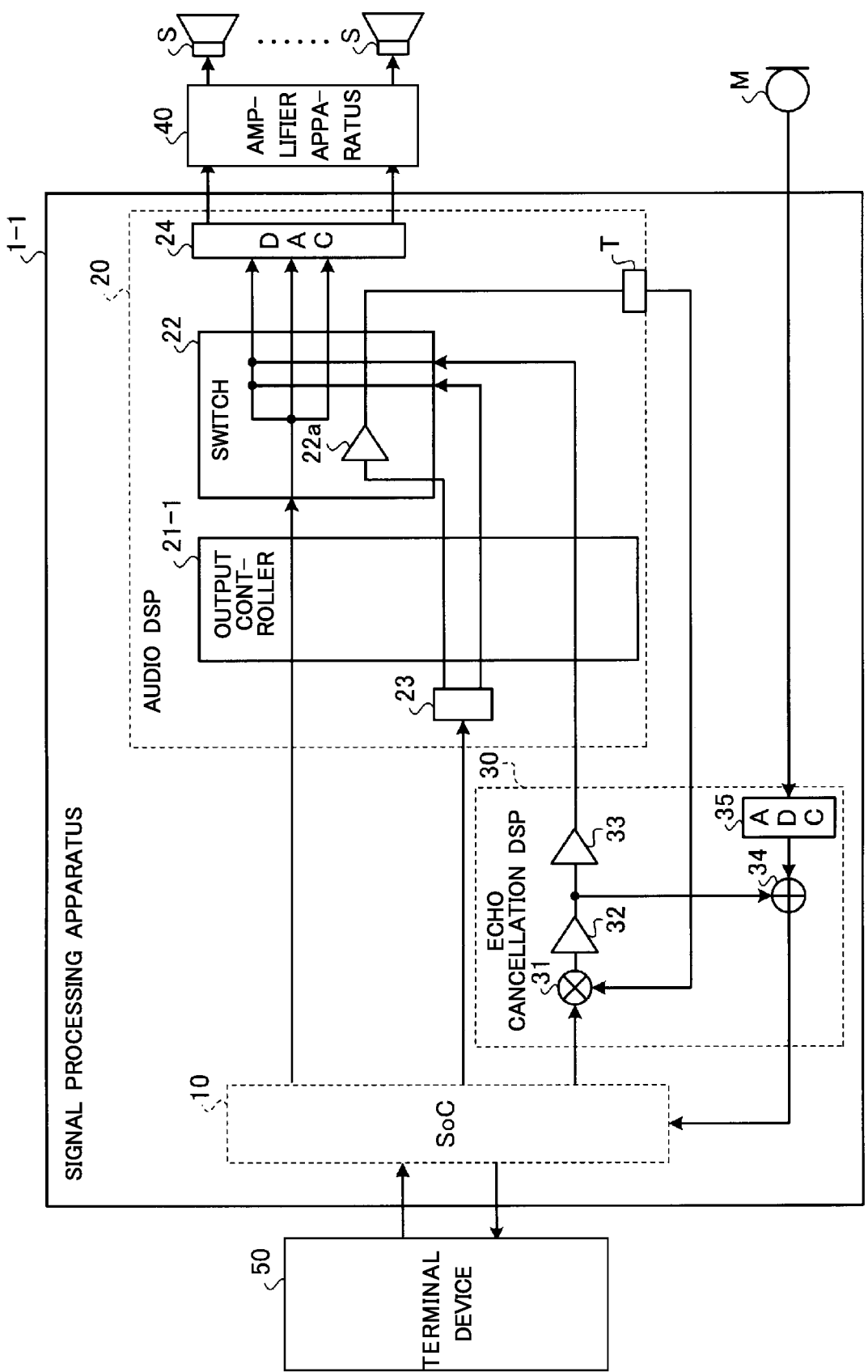
FIG. 6 illustrates a block diagram of a signal processing apparatus of a modification.

FIG. 6 illustrates a block diagram of a signal processing apparatus 1-1 of a modification. The signal processing apparatus 1-1 shown in FIG. 6 is different from the signal processing apparatus 1 in FIG. 2 in terms of presence/absence of the amplifiers 21a to 21c included in the output controller 21 and an amplifier apparatus 40.

As shown in FIG. 6, the signal processing apparatus 1-1 is connected to the amplifier apparatus 40. The amplifier apparatus 40 amplifies a sound signal input from the signal processing apparatus 1-1, and outputs the sound signal to a loudspeaker S. Thus, an output controller 21-1 obtains a volume value set by the amplifier apparatus 40 for an over-the-phone sound signal Sc, and suppresses a level of a dial tone signal Sd based on the set volume value.

Here, an audio dynamic range of the amplifier apparatus 40 is greater than an amplifier function of the signal processing apparatus 1. In this case, when each of the signal processing apparatus 1 and the amplifier apparatus 40 outputs sound signals at a same set volume value, sound output from the amplifier apparatus 40 is generally known to be heard smaller.

Therefore, a sound volume threshold set for the signal processing apparatus 1-1 is greater than the foregoing sound volume threshold set for the signal processing apparatus 1. The sound volume threshold in this case may be a value that is derived beforehand based on an experiment and the like in accordance with performance of the amplifier apparatus 40 and an acoustic space, i.e., a sound system.

As described above, even if the signal processing apparatus 1-1 is applied to any sound system, the system sound signal can be properly cancelled because the sound volume threshold is set based on the sound system.

The sound volume threshold of the signal processing apparatus 1 may be set, for example, based on a system on a setting screen that is selected by the user. The sound volume threshold of the signal processing apparatus 1 may be automatically set in accordance with a device connected.

The foregoing embodiment described the cases in which the system sound signal is the dial tone signal Sd and the interrupt sound signal Sw. However, the invention is not limited to those cases. In other words, for example, the sound signal of an audio may be regarded as the system sound signal.

Further, in the foregoing embodiment, only the dial tone signal Sd of the system sound signals is cancelled by the echo cancellation circuit 34. However, the invention is not limited to this. The interrupt sound signal Sw may be cancelled by the echo cancellation circuit 34.

Further effects and modifications can be easily derived by a person skilled in the art. Therefore, modes broader than this invention are not limited by the specific description and typical modifications described and expressed above. Therefore, various modifications are possible without departing from the comprehensive sprit and scope of ideas of the invention defined by the attached scope of claims and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. A signal processing apparatus comprising:
 a generator that generates an output sound signal by combining an over-the-phone sound signal with a system sound signal different from the over-the-phone sound signal;
 an output controller that outputs, to a loudspeaker, the output sound signal generated by the generator; and
 an echo canceller that cancels the output sound signal from an input sound signal input via a microphone located in a vicinity of the loudspeaker, wherein the output controller:
 (a) suppresses a level of the system sound signal before the generator combines the system sound signal with the over-the-phone signal so that a volume level of the system sound signal to be output from the loudspeaker is not greater than a predetermined value that is within a range in which a volume value for the over-the-phone sound signal is settable,
 (b) determines whether the system sound signal includes a dial tone signal or an interrupt sound signal,
 (c) includes a switching element that switches a signal route of the dial tone signal so that the dial tone signal goes through the echo canceller when the system sound signal includes the dial tone signal, the output controller suppressing a level of the dial tone signal so that the volume level of the dial tone signal is not greater than the predetermined value when the dial tone signal is output from the loudspeaker at least during telephone communication, and
 (d) switches, with the switching element, the signal route of the interrupt sound signal so that the interrupt sound signal bypasses the echo canceller and does not go through the echo canceller when the system sound signal is the interrupt sound signal, and wherein
 the signal route of the dial tone signal, downstream of the switching element, goes through the output controller a first time during which the level of the dial tone signal is suppressed before being combined with the over-the-phone signal, and goes through the output controller a second time after being combined with the over-the-phone signal before being output to the loudspeaker.

2. The signal processing apparatus according to claim 1, wherein
 the output controller suppresses the level of the system sound signal based on the volume value set for the over-the-phone sound signal, and when the set volume value is greater than a predetermined threshold, the output controller suppresses the level of the system sound signal so that the volume level of the system sound signal output from the loudspeaker is not greater than the predetermined value.

3. A signal processing method comprising the steps of:
 generating, with a generator, an output sound signal by combining an over-the-phone sound signal with a system sound signal different from the over-the-phone sound signal;
 outputting, with an output controller, to a loudspeaker, the output sound signal; and
 cancelling, with an echo canceller, the output sound signal from an input sound signal input via a microphone located in a vicinity of the loudspeaker, wherein the outputting with the output controller includes:
 (a) suppressing a level of the system sound signal before combining the system sound signal with the over-the-phone signal so that a volume level of the system sound signal to be output from the loudspeaker is not greater than a predetermined value that is within a range in which a volume value for the over-the-phone sound signal is settable,
 (b) determining whether the system sound signal includes a dial tone signal or an interrupt sound signal,
 (c) switching, with a switching element, a signal route of the dial tone signal so that the dial tone signal goes through the echo canceller when the system sound signal includes the dial tone signal, and so that a level of the dial tone signal is suppressed so that the volume level of the dial tone signal is not greater than the predetermined value when the dial tone signal is output from the loudspeaker at least during telephone communication, and
 (d) switching, with the switching element, the signal route of the interrupt sound signal so that the interrupt sound signal bypasses the echo canceller and does not go through the echo canceller when the system sound signal is the interrupt sound signal, and wherein the signal route of the dial tone signal, downstream of the switching element, goes through the output controller a first time during which the level of the dial tone signal is suppressed before being combined with the over-the-phone signal, and goes through the output controller a second time after being combined with the over-the-phone signal before being output to the loudspeaker.

4. The signal processing method according to claim 3, wherein the suppressing suppresses the level of the system sound signal based on the volume value set for the over-the-phone sound signal, and when the set volume value is greater than a predetermined threshold, the suppressing suppresses the level of the system sound signal so that the volume level of the system sound signal output from the loudspeaker is not greater than the predetermined value.

\* \* \* \* \*